United States Patent
Berggren et al.

(10) Patent No.: US 11,805,554 B2
(45) Date of Patent: Oct. 31, 2023

(54) CLIENT DEVICE AND NETWORK ACCESS NODE FOR TRANSMITTING AND RECEIVING A RANDOM ACCESS PREAMBLE

(71) Applicant: Huawei Technologies Co., Ltd., Shenzhen (CN)

(72) Inventors: Fredrik Berggren, Kista (SE); Peng Wang, Kista (SE); Branislav M. Popovic, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 469 days.

(21) Appl. No.: 17/150,949

(22) Filed: Jan. 15, 2021

(65) Prior Publication Data
US 2021/0136836 A1 May 6, 2021

Related U.S. Application Data

(63) Continuation of application No. PCT/EP2018/076152, filed on Sep. 26, 2018.

(51) Int. Cl.
*H04W 74/08* (2009.01)
*H04L 1/00* (2006.01)
(Continued)

(52) U.S. Cl.
CPC ....... *H04W 74/0833* (2013.01); *H04L 1/0071* (2013.01); *H04L 1/1861* (2013.01);
(Continued)

(58) Field of Classification Search
None
See application file for complete search history.

(56) References Cited

U.S. PATENT DOCUMENTS

| | | | |
|---|---|---|---|
| 8,493,924 B2 * | 7/2013 | Kwon | H04L 27/2613 370/329 |
| 10,015,002 B2 * | 7/2018 | Seo | H04W 24/08 |

(Continued)

FOREIGN PATENT DOCUMENTS

| | | |
|---|---|---|
| CN | 104393973 A | 3/2015 |
| CN | 107295653 A | 10/2017 |

(Continued)

OTHER PUBLICATIONS

PCT/EP2018/076152, Written Opinion of the International Searching Authority, dated Apr. 30, 2019 (Year: 2019).*

(Continued)

*Primary Examiner* — Faiyazkhan Ghafoerkhan
(74) *Attorney, Agent, or Firm* — Leydig, Voit & Mayer, Ltd.

(57) ABSTRACT

The present disclosure relates to a client device and a network access node for transmitting and receiving a random access preamble which comprises a division of a set of resource blocks available for transmission of the random access preamble into at least two subsets of resource blocks, wherein each resource block in the set of resource blocks comprises a plurality of subcarriers, a first selection of resource blocks within the first subset of resource blocks and a second selection of resource blocks within the second subset of resource blocks, wherein the first selection of resource blocks is different to the second selection of resource blocks, and a mapping of a modulation sequence of the random access preamble onto at least one subcarrier in each selected resource block. Thereby, lower side-lobes of the auto-correlation function is achieved. Furthermore, the present disclosure also relates to corresponding methods and a computer program.

18 Claims, 8 Drawing Sheets

(51) Int. Cl.
*H04L 1/1829* (2023.01)
*H04L 5/00* (2006.01)
*H04L 27/26* (2006.01)
*H04W 74/00* (2009.01)

(52) U.S. Cl.
CPC ........ *H04L 5/0053* (2013.01); *H04L 27/2613* (2013.01); *H04W 74/002* (2013.01)

(56) References Cited

U.S. PATENT DOCUMENTS

| | | | | |
|---|---|---|---|---|
| 10,644,860 | B2* | 5/2020 | Seo | H04L 5/001 |
| 11,336,421 | B2* | 5/2022 | Seo | H04W 72/23 |
| 2014/0146768 | A1* | 5/2014 | Seo | H04L 27/2601 370/329 |
| 2014/0376456 | A1* | 12/2014 | Kim | H04L 5/0055 370/329 |
| 2015/0282215 | A1* | 10/2015 | Eriksson | H04W 74/0833 370/329 |
| 2016/0191226 | A1* | 6/2016 | Seo | H04L 5/001 370/241 |
| 2016/0353440 | A1* | 12/2016 | Lee | H04W 74/0833 |
| 2017/0079070 | A1* | 3/2017 | Lu | H04L 5/0053 |
| 2017/0142766 | A1* | 5/2017 | Kim | H04W 36/0055 |
| 2018/0310329 | A1* | 10/2018 | Yang | H04L 1/1607 |
| 2018/0323945 | A1* | 11/2018 | Seo | H04W 72/0453 |
| 2019/0037569 | A1* | 1/2019 | Lee | H04W 72/53 |
| 2019/0357222 | A1* | 11/2019 | Lou | H04W 4/70 |
| 2021/0136836 | A1* | 5/2021 | Berggren | H04L 5/003 |

FOREIGN PATENT DOCUMENTS

| | | | |
|---|---|---|---|
| WO | 2015144208 | A1 | 10/2015 |
| WO | 2018045247 | A1 | 3/2018 |

OTHER PUBLICATIONS

PCT/EP2018/076152, International Search report, dated Apr. 30, 2019 (Year: 2019).*
Huawei et al., "UL PHY channels for NR unlicensed," 3GPP TSG RAN WG1 Meeting #94, Gothenburg, Sweden, R1-1808060, total 17 pages, 3rd Generation Partnership Project, Valbonne, France (Aug. 20-Aug. 24, 2018).
Huawei et al., "Zero-autocorrelation zone of frequency-interlaced PRACH," 3GPP TSG RAN WG1 Meeting #94, Gothenburg, Sweden, R1-1808066, total 7 pages, 3rd Generation Partnership Project, Valbonne, France (Aug. 20-Aug. 24, 2018).
Ericsson, "On UL signals and channels," 3GPP TSG-RAN WG1 Meeting #94, Gothenburg, Sweden, R1-1809203, total 19 pages, 3rd Generation Partnership Project, Valbonne, France (Aug. 20-Aug. 24, 2018).
ETSI, "5 GHz RLAN; Harmonised Standard covering the essential requirements of article 3.2 of Directive 2014/53/EU," ETSI EN 301 893 V2.1.1, total 122 pages (May 2017).

* cited by examiner

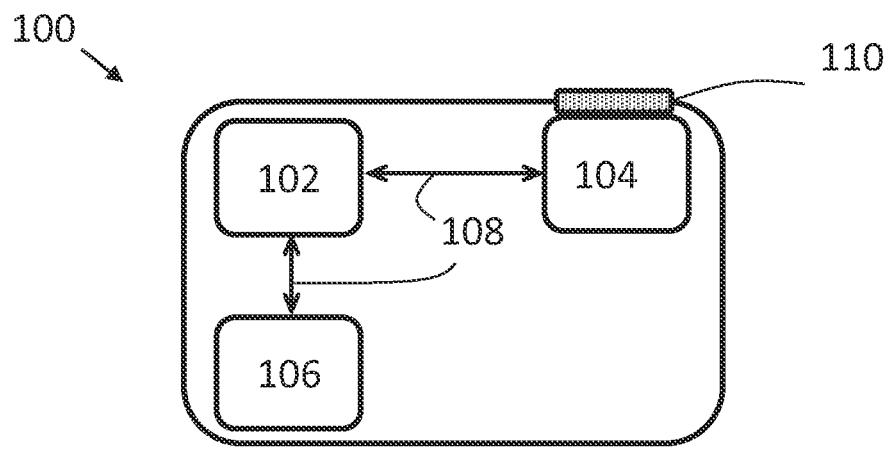
Fig. 1
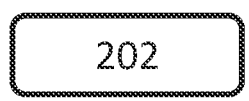
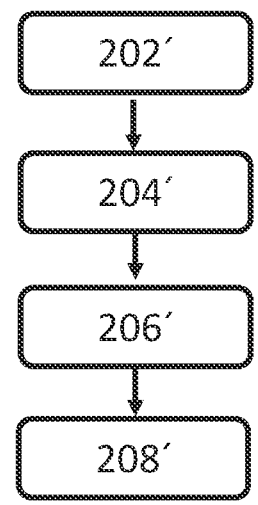
Fig. 2a          Fig. 2b

500

CLIENT DEVICE AND NETWORK ACCESS NODE FOR TRANSMITTING AND RECEIVING A RANDOM ACCESS PREAMBLE

CROSS-REFERENCE TO RELATED APPLICATIONS

This application is a continuation of International Application No. PCT/EP2018/076152, filed on Sep. 26, 2018, the disclosure of which is hereby incorporated by reference in its entirety.

TECHNICAL FIELD

The present disclosure relates to a client device and a network access node for transmitting and receiving a random access preamble. Furthermore, the present disclosure also relates to corresponding methods and a computer program.

BACKGROUND

In cellular communication systems the User Equipment (UE) can send Physical Random Access Channel (PRACH) preambles to the base station, e.g., eNB or gNB. The purpose of transmitting the preamble could, e.g., be random access, handover request, time synchronization, beam management, beam recovery etc., including both contention-based and contention-free PRACH transmissions. Typically, the PRACH preamble is a signal or a sequence, which is detected at the base station by means of a correlation receiver, e.g., a matched filter. The detection performance is therefore dependent on its auto-correlation properties, wherein it is desirable to have a narrow main-lobe and small side-lobes. Moreover, the cross-correlation among PRACH preambles should be low.

In a multicarrier system, e.g., OFDM, a PRACH preamble could be generated by mapping a modulation sequence onto a set of subcarriers. In contemporary systems, such as LTE and NR, Zadoff-Chu sequences are deployed for PRACH on a set of contiguous subcarriers. These preambles are known to have ideal auto-correlation properties (i.e., there is a Zero-Auto-correlation-Zone (ZAZ)) and their cross-correlation is low. However, in certain cases it is not preferable to use a set of contiguous subcarriers. For example, in unlicensed spectrum, there are limits on the Power Spectral Density (PSD) and requirements on Occupied Channel Bandwidth (OCB). The PSD requirement could be, e.g., in terms of a maximum transmit power per any 1 MHz bandwidth part, which means that it is advantageous to map the modulation sequence to a wide bandwidth to increase the transmit power. The OCB requirement implies that the signal is to occupy a certain percentage of the carrier bandwidth, which means that the modulation sequence has to be mapped over a sufficiently large portion of the carrier bandwidth. These requirements have resulted in preambles that map the modulation sequence into time-frequency resource blocks of subcarriers, e.g., Physical Resource Blocks (PRBs), which are non-consecutive and spread over the carrier bandwidth. This is sometimes referred to as Block-Interleaved Frequency Division Multiple Access (B-IFDMA) as signals can be multiplexed in different blocks. The frequency spacing between the mapped PRBs could be either uniform or non-uniform and the set of mapped PRBs is sometimes referred to as an interlacement, or an interlace.

SUMMARY

An objective of embodiments of the present disclosure is to provide a solution which mitigates or solves the drawbacks and problems of conventional solutions.

The above and further objectives are solved by the subject matter of the independent claims. Further advantageous embodiments of the present disclosure can be found in the dependent claims.

According to a first aspect of the present disclosure, the above mentioned and other objectives are achieved with a client device for a wireless communication system, the client device being configured to transmit a random access preamble to a network access node 300, the random access preamble comprising a division of a set of resource blocks available for transmission of the random access preamble into at least two subsets of resource blocks, wherein each resource block in the set of resource blocks comprises a plurality of subcarriers;

a first selection of resource blocks within the first subset of resource blocks and a second selection of resource blocks within the second subset of resource blocks, wherein the first selection of resource blocks is different to the second selection of resource blocks;

a mapping of a modulation sequence of the random access preamble onto at least one subcarrier in each selected resource block.

The random access preamble herein can e.g. be a PRACH random access preamble used in LTE and NR systems. The resource blocks mentioned can be time-frequency resources, such as physical resource blocks (PRBs), virtual resource blocks (VRBs) or common resource blocks (CRBs). In the following, the term resource block encompasses any of these terms.

The random access preamble can be obtained by the client device in a number of different ways. In a first non-limiting example the random access preamble may be derived from a table provided in a standard, e.g. in the form of resource block positions. In a second non-limiting example the random access preamble may be generated by the client device itself, e.g. through suitable processing means executing an algorithm for generating the random access preamble.

An advantage of the client device according to the first aspect is that random access preambles can be used resulting in lower side-lobes of the auto-correlation function compared to conventional solutions using an interlaced time-frequency resource structure. Therefore, both mis-detection probability and false detection probability is reduced in the system.

In an implementation form of a client device according to the first aspect, the same number of resource blocks is selected from each subset of resource blocks.

An advantage with this implementation form is that pseudo-randomness in the resource allocation, i.e., an irregular resource block mapping, could be obtained over a large bandwidth while allowing a systematic way of constructing the random access preamble by applying the same mapping principle for each subset of resource blocks.

In an implementation form of a client device according to the first aspect, at least one resource block in a subset of resource blocks is selected based on at least one random variable, an interleaver, or a binary sequence.

An advantage with this implementation form is that pseudo-randomness in the resource allocation, i.e., an irregular resource block mapping, could be obtained for the random access preamble in a simple way. For example, using random variables or interleavers to permute the positions of allocated resource block, or using a binary sequence with desirable properties to produce an irregular resource allocation.

In an implementation form of a client device according to the first aspect, indices corresponding to resource blocks of a subset of resource blocks are permuted based on the random variable, the interleaver, or the binary sequence, and wherein resource blocks in the subset of resource blocks are selected based on the permuted indices.

An advantage with this implementation form is that each subset could be processed independently, while achieving an irregular resource block mapping for the random access preamble.

In an implementation form of a client device according to the first aspect, at least one subcarrier in each selected resource block is selected based on at least one random variable, an interleaver, or a binary sequence.

It is to be noted that the aspects of selecting subcarriers for modulation of the random access preamble given herein are not limited to the selection of resource blocks according to embodiments of the present disclosure. This implies that the selection of subcarriers according to embodiments of the present disclosure can also be combined with selection of resource blocks according to conventional solutions.

An advantage with this implementation form is that an improved auto-correlation function could be obtained also for regularly mapped resource blocks allocated for the random access preamble.

In an implementation form of a client device according to the first aspect, indices corresponding to subcarriers of a selected resource block are permuted based on the random variable, the interleaver or the binary sequence, and wherein subcarriers in the selected resource block are selected based on the permuted indices.

An advantage with this implementation form is that the sidelobes of the auto-correlation function could be further suppressed while processing the subcarrier mapping independently for each allocated resource block.

In an implementation form of a client device according to the first aspect, the same number of subcarriers is selected in each selected resource block.

An advantage with this implementation form is that the multiplexing capacity for the random access preamble is uniform over the bandwidth and within each allocated resource block.

In an implementation form of a client device according to the first aspect, a selection of modulated subcarriers in a selected resource block is different from a selection of modulated subcarriers in another selected resource block.

An advantage with this implementation form is that a non-uniform subcarrier allocation can be obtained for the set of allocated resource blocks which improves the auto-correlation function.

In an implementation form of a client device according to the first aspect, a length of the modulation sequence is equal to or larger than a total number of modulated subcarriers.

An advantage with this implementation form is that if the length is larger than a total number of modulated subcarriers, a single long random access modulation sequence could be defined, which is punctured into the desired length for any frequency resource allocation. If the length is smaller than a total number of modulated subcarriers, further adaptations could be made for the modulation sequence, e.g., in relation to the resulting Peak-to-Average-Power-Ratio (PAPR) of the random access preamble.

In an implementation form of a client device according to the first aspect, the set of resource blocks is equal to a total number of resource blocks configured for the client device.

An advantage with this implementation form is that it allows using any resource block in the mapping, thus maximizing the irregularity of the resource block allocation.

In an implementation form of a client device according to the first aspect, the set of resource blocks is a subset of a total number of resource blocks configured for the client device.

An advantage with this implementation form is that the transmitter of the client device could operate on a smaller bandwidth than the system bandwidth, which is beneficial for lowering the power consumption in the client device.

In an implementation form of a client device according to the first aspect, indices of the set of resource blocks are arranged according to an enumeration $i=0, 1, \ldots p-1$ associated with $Q_i$ resource blocks $m_i \in \{i, i+p, i+2p, \ldots, i+(Q_i-1)p\}$ where p is an integer, and wherein the subset of the total number of resource blocks configured for the client device comprises resource blocks obtained from at most $p-1$ enumerations.

An advantage with this implementation form is that the resource blocks that could be mapped for the random access preamble are taken from a subset of the interlaces, i.e., the enumerations. This allows multiplexing the random access preamble with other channels occupying the remaining interlaces.

In an implementation form of a client device according to the first aspect, wherein indices of the set of resource blocks are arranged according to an enumeration $i=0, 1, \ldots p-1$ associated with $Q_i$ resource blocks $m_i \in \{i, i+p, i+2p, \ldots, i+(Q_i-1)p\}$ where p is an integer, and wherein the set of resource blocks are divided into subsets of resource blocks so that the number of subsets is equal to a maximum $Q_i$ value and wherein the number of subsets comprising one resource block from each enumeration i is maximized.

An advantage with this implementation form is that it provides an equal, or almost equal, division of the available resource blocks into subsets, such that as many subsets as possible contain a resource block from every interlace. This is beneficial as it provides means for processing the resource block allocation independently for each subset while offering possibility to allocate the same number of resource blocks from every interlace.

According to a second aspect of the present disclosure, the above mentioned and other objectives are achieved with a network access node for a wireless communication system, the network access node being configured to receive a signal comprising a random access preamble from a client device, wherein the random access preamble comprises a division of a set of resource blocks available for transmission of the random access preamble into at least two subsets of resource blocks, wherein each resource block in the set of resource blocks comprises a plurality of subcarriers, a first selection of resource blocks within the first subset of resource blocks and a second selection of resource blocks within the second subset of resource blocks, wherein the first selection of resource blocks is different to the second selection of resource blocks, a mapping of a modulation sequence of the random access preamble onto at least one subcarrier in each selected resource block; and detect at least one of the random access preamble and an arrival timing of the random access preamble based on the received signal.

An advantage of the network access node according to the second aspect is that random access preambles can be used resulting in lower side-lobes of the auto-correlation function compared to conventional solutions. Therefore, both mis-detection probability and false detection probability is reduced in the system.

According to a third aspect of the present disclosure, the above mentioned and other objectives are achieved with a method for a client device, the method comprises transmitting a random access preamble to a network access node, the random access preamble comprising a division of a set of resource blocks available for transmission of the random access preamble into at least two subsets of resource blocks, wherein each resource block in the set of resource blocks comprises a plurality of subcarriers;

a first selection of resource blocks within the first subset of resource blocks and a second selection of resource blocks within the second subset of resource blocks, wherein the first selection of resource blocks is different to the second selection of resource blocks;

a mapping of a modulation sequence of the random access preamble onto at least one subcarrier in each selected resource block.

The method according to the third aspect can be extended into implementation forms corresponding to the implementation forms of the client device according to the first aspect. Hence, an implementation form of the method comprises the feature(s) of the corresponding implementation form of the client device.

The advantages of the methods according to the third aspect are the same as those for the corresponding implementation forms of the client device according to the first aspect.

According to a fourth aspect of the present disclosure, the above mentioned and other objectives are achieved with a method for a network access node, the method comprises receiving a signal comprising a random access preamble from a client device, wherein the random access preamble comprises a division of a set of resource blocks available for transmission of the random access preamble into at least two subsets of resource blocks, wherein each resource block in the set of resource blocks comprises a plurality of subcarriers, a first selection of resource blocks within the first subset of resource blocks and a second selection of resource blocks within the second subset of resource blocks, wherein the first selection of resource blocks is different to the second selection of resource blocks, a mapping of a modulation sequence of the random access preamble onto at least one subcarrier in each selected resource block;

detecting at least one of the random access preamble and an arrival timing of the random access preamble based on the received signal.

The method according to the fourth aspect can be extended into implementation forms corresponding to the implementation forms of the network access node according to the second aspect. Hence, an implementation form of the method comprises the feature(s) of the corresponding implementation form of the network access node.

The advantages of the methods according to the fourth aspect are the same as those for the corresponding implementation forms of the network access node according to the second aspect.

According to a fifth aspect of the present disclosure, the above mentioned and other objectives are achieved with a client device for a wireless communication system, the client device being configured to divide a set of resource blocks available for transmission of a random access preamble into at least two subsets of resource blocks, wherein each resource block in the set of resource blocks comprises a plurality of subcarriers;

select resource blocks in a first subset of resource blocks and resource blocks in a second subset of resource blocks so that the selection of resource blocks within the first subset of resource blocks is different from the selection of resource blocks within the second subset of resource blocks;

map a modulation sequence of the random access preamble onto at least one subcarrier in each selected resource block so as to obtain a set of modulated subcarriers; and transmit the set of modulated subcarriers to a network access node.

The generation of the random access preamble can e.g. be performed in a processor of the client device.

The advantages of the client device according to the fifth aspect and its implementation forms are the same as the corresponding client device according to the first aspect and its implementation forms.

In an implementation form of a client device according to the fifth aspect, the client device is further configured to select the same number of resource blocks from each subset of resource blocks.

In an implementation form of a client device according to the fifth aspect, wherein select resource blocks in a subset of resource blocks comprises select at least one resource block in a subset of resource blocks based on at least one random variable, an interleaver, or a binary sequence.

In an implementation form of a client device according to the fifth aspect, the client device is further configured to permute indices corresponding to resource blocks of a subset of resource blocks based on the random variable, the interleaver, or the binary sequence;

select resource blocks in the subset of resource blocks based on the permuted indices.

In an implementation form of a client device according to the fifth aspect, the client device is further configured to select at least one subcarrier in each selected resource block based on at least one random variable, an interleaver, or a binary sequence.

In an implementation form of a client device according to the fifth aspect, the client device is further configured to permute indices corresponding to subcarriers of a selected resource block based on the random variable, the interleaver, or the binary sequence;

select subcarriers in the selected resource block based on the permuted indices.

In an implementation form of a client device according to the fifth aspect, the client device is further configured to select the same number of subcarriers in each selected resource block.

In an implementation form of a client device according to the fifth aspect, wherein modulated subcarriers in a selected resource block is different to modulated subcarriers in another selected resource block.

In an implementation form of a client device according to the fifth aspect, a length of the modulation sequence is equal to or larger than a total number of modulated subcarriers.

In an implementation form of a client device according to the fifth aspect, the set of resource blocks is equal to a total number of resource blocks configured for the client device.

In an implementation form of a client device according to the fifth aspect, the set of resource blocks is a subset of a total number of resource blocks configured for the client device.

In an implementation form of a client device according to the fifth aspect, indices of the set of resource blocks are arranged according to an enumeration i=0, 1, . . . p−1 associated with $Q_i$ resource blocks $m_i \in \{i, i+p, i+2p, \ldots, i+(Q_i-1)p\}$ where p is an integer, and wherein the subset of the total number of resource blocks configured for the client device comprises resource blocks obtained from at most p−1 enumerations.

In an implementation form of a client device according to the fifth aspect, indices of the set of resource blocks are arranged according to an enumeration i=0, 1, . . . p−1 associated with $Q_i$ resource blocks $m_i \in \{i, i+p, i+2p, \ldots, i+(Q_i-1)p\}$ where p is an integer, and wherein the set of resource blocks are divided into subsets of resource blocks so that the number of subsets is equal to a maximum $Q_i$ value and wherein the number of subsets comprising one resource block from each enumeration i is maximized.

The present disclosure also relates to a computer program, characterized in program code, which when run by at least one processor causes said at least one processor to execute any method according to embodiments of the present disclosure. Further, the present disclosure also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the embodiments of the present disclosure will be apparent from the following detailed description.

BRIEF DESCRIPTION OF THE DRAWINGS

The appended drawings are intended to clarify and explain different embodiments of the present disclosure, in which:

FIG. 1 shows a client device according to an embodiment of the present disclosure;

FIGS. 2a and 2b show two different methods for a client device according to embodiments of the present disclosure;

DETAILED DESCRIPTION

Figure 3:
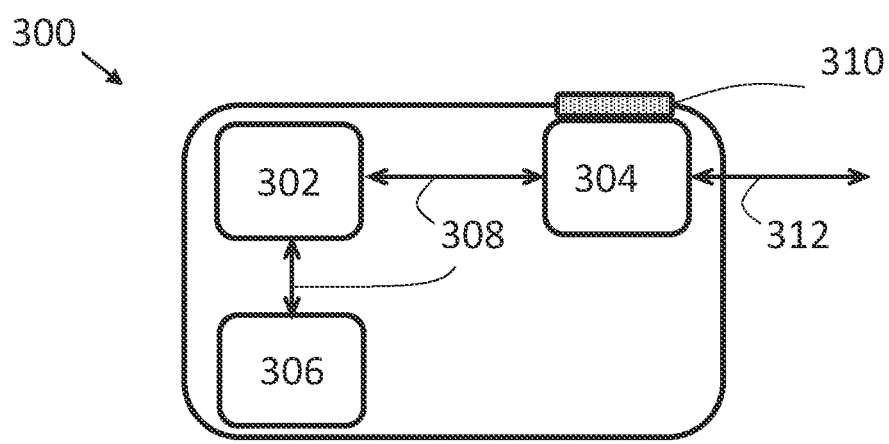
FIG. 3 shows a network access node according to an embodiment of the present disclosure.

A PRACH preamble that maps the modulation sequence onto a uniformly frequency spaced set of PRBs exhibits a Zero-Auto-correlation-Zone (ZAZ), of which the length depends on the frequency spacing between the PRBs. However, it can be found that large side-lobes appear outside the ZAZ in the auto-correlation function. These side-lobes are problematic if the detection window of the receiver is larger than the ZAZ as they could result in large mis-detection probability and large time synchronization estimation error. Hence, it is desirable to provide a PRACH preamble where the modulation sequence of the PRACH preamble is mapped to subcarriers in a set of non-contiguous PRBs, while suppressing the side-lobes.

If the PRACH preamble modulation sequence is mapped to a set of uniformly frequency spaced PRBs, there exists a ZAZ and that the ZAZ time span is inversely proportional to the frequency spacing between the mapped PRBs. The periodic autocorrelation function $\theta_{xx}(p)$ of any sequence mapped to a set of uniformly frequency spaced PRBs has a ZAZ of size D if $$\theta_{xx}(p) = \begin{cases} 0, & |p| = 1, 2, \ldots, D \\ \neq 0, & |p| = D+1 \end{cases}.$$

Thus, if the detection window is not longer than the ZAZ, D, there will not be any side-lobes at the correlator output. The size of the detection window is typically set to account for the maximum round trip time delay, i.e., corresponding to two times of the maximum cell radius, and the maximum channel delay spread. However, there are significant side-lobes outside the ZAZ, i.e., when p≥D+1. Thus, if the detection window is set beyond the ZAZ, e.g., in order to support a larger cell radius, side-lobes will appear at the correlator output, causing larger mis-detection probability and larger time synchronization estimation error.

There are two prioritized performance measures for the PRACH preamble: mis-detection probability—the probability that a transmitted preamble is not detected or a transmitted preamble is detected with a time synchronization estimation error beyond a certain limit; and false detection probability—the probability that a preamble which is not transmitted is detected.

Large side-lobes in the auto-correlation function of a PRACH preamble increase the mis-detection probability and create large time synchronization estimation errors. Large cross-correlation among preambles increase the false detection probability.

To solve and/or mitigate the drawbacks of conventional solutions it is herein disclosed a client device and a network access node using a random access preamble where the modulation sequence is mapped to subcarriers in a set of non-contiguous frequency blocks as to suppress the sidelobes in the auto-correlation function while producing a set of random access preambles with low cross-correlation.

FIG. 1 shows a client device 100 according to an embodiment of the present disclosure. In the embodiment shown in FIG. 1, the client device 100 comprises a processor 102, a transceiver 104 and a memory 106. The processor 102 is coupled to the transceiver 104 and the memory 106 by communication means 108 known in the art. The client device 100 further comprises an antenna or antenna array 110 coupled to the transceiver 104, which means that the client device 100 is configured for wireless communications in a wireless communication system. That the client device 100 is configured to perform certain actions can in this disclosure be understood to mean that the client device 100 comprises suitable means, such as e.g. the processor 102 and the transceiver 104, configured to perform said actions.

According to embodiments of the present disclosure the client device 100 is configured to transmit a random access preamble to a network access node 300. The random access preamble comprises a division of a set of resource blocks available for transmission of the random access preamble into at least two subsets of resource blocks, wherein each resource block in the set of resource blocks comprises a plurality of subcarriers. The random access preamble further comprises a first selection of resource blocks within the first subset of resource blocks and a second selection of resource blocks within the second subset of resource blocks, wherein the first selection of resource blocks is different to the second selection of resource blocks. The random access preamble further comprises a mapping of a modulation sequence of the random access preamble onto at least one subcarrier in each selected resource block.

According to an alternative embodiment of the present disclosure the client device 100 is configured to divide a set of resource blocks available for transmission of a random access preamble into at least two subsets of resource blocks, wherein each resource block in the set of resource blocks comprises a plurality of subcarriers. The client device 100 is further configured to select resource blocks in a first subset of resource blocks and resource blocks in a second subset of resource blocks so that the selection of resource blocks within the first subset of resource blocks is different from the selection of resource blocks within the second subset of resource blocks. The client device 100 is further configured to map a modulation sequence of the random access preamble onto at least one subcarrier in each selected resource block so as to obtain a set of modulated subcarriers. The client device 100 is further configured to transmit the set of modulated subcarriers to a network access node 300.

The generation of the random access preamble can be performed by the processor 102 of the client device 100, including determining the allocated resource blocks and subcarriers using random number generators, interleavers or binary sequences. The random access preamble can also be defined by a standard and the allocated resource blocks and subcarriers could be derived from a table provided by the standard known to both the transmitter of the client device 100 and the receiver of the network access node 300.

FIG. 2*a* shows a flow chart of a method 200 which may be executed in a client device 100, such as the one shown in FIG. 1. The method 200 comprises transmitting 202 a random access preamble to a network access node 300. The random access preamble has the same properties as previously described.

FIG. 2*b* shows a flow chart of an alternative method 200' which may be executed in a client device 100, such as the one shown in FIG. 1. The method 200' comprises dividing 202 a set of resource blocks available for transmission of a random access preamble into at least two subsets of resource blocks, wherein each resource block in the set of resource blocks comprises a plurality of subcarriers. The method 200' comprises selecting 204' resource blocks in a first subset of resource blocks and resource blocks in a second subset of resource blocks so that the selection of resource blocks within the first subset of resource blocks is different from the selection of resource blocks within the second subset of resource blocks. The method 200' comprises mapping 206' a modulation sequence of the random access preamble onto at least one subcarrier in each selected resource block so as to obtain a set of modulated subcarriers. The method 200' comprise transmitting 208' the set of modulated subcarriers to a network access node 300.

FIG. 3 shows a network access node 300 according to an embodiment of the present disclosure. In the embodiment shown in FIG. 3, the network access node 300 comprises a processor 302, a transceiver 304 and a memory 306. The processor 302 is coupled to the transceiver 304 and the memory 306 by communication means 308 known in the art. The network access node 300 may be configured for both wireless and wired communications in wireless and wired communication systems, respectively. The wireless communication capability is provided with an antenna or antenna array 310 coupled to the transceiver 304, while the wired communication capability is provided with a wired communication interface 312 coupled to the transceiver 304. That the network access node 300 is configured to perform certain actions can in this disclosure be understood to mean that the network access node 300 comprises suitable means, such as e.g. the processor 302 and the transceiver 304, configured to perform said actions.

According to embodiments of the present disclosure the network access node 300 is configured to receive a signal 502 comprising a random access preamble from a client device 100. The random access preamble comprises a division of a set of resource blocks available for transmission of the random access preamble into at least two subsets of resource blocks, wherein each resource block in the set of resource blocks comprises a plurality of subcarriers. The random access preamble further comprises a first selection of resource blocks within the first subset of resource blocks and a second selection of resource blocks within the second subset of resource blocks, wherein the first selection of resource blocks is different to the second selection of resource blocks. The random access preamble further comprises a mapping of a modulation sequence of the random access preamble onto at least one subcarrier in each selected resource block. The network access node 300 is further configured to detect at least one of the random access preamble and an arrival timing of the random access preamble based on the received signal 502.

Figure 4:
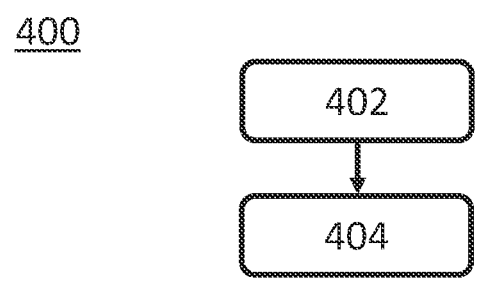
FIG. 4 shows a method for a network access node according to an embodiment of the present disclosure.

FIG. 4 shows a flow chart of a corresponding method 400 which may be executed in a network access node 300, such as the one shown in FIG. 3. The method 400 comprises receiving 402 a signal 502 comprising a random access preamble from a client device 100. The random access preamble comprises a division of a set of resource blocks available for transmission of the random access preamble into at least two subsets of resource blocks, wherein each resource block in the set of resource blocks comprises a plurality of subcarriers. The random access preamble further comprises a first selection of resource blocks within the first subset of resource blocks and a second selection of resource blocks within the second subset of resource blocks, wherein the first selection of resource blocks is different to the second selection of resource blocks. The random access preamble further comprises a mapping of a modulation sequence of the random access preamble onto at least one subcarrier in each selected resource block. The method 400 further comprises detecting 404 at least one of the random access preamble and an arrival timing of the random access preamble based on the received signal 502.

Generally, if the random access preamble is known to the network access node 300, only its timing needs to be detected by the network access node 300. However, if the preamble is unknown to the network access node 300, both the preamble and its timing need to be detected by the network access node 300. The network access node 300 is configured to process the received signal 502 and may apply a correlation operation as to detect a peak value, which should be above a certain detection threshold in order to be a valid random access preamble candidate. The network access node 300 may further be configured to use a bank of correlators, each correlator being matched to one random access preamble, so as to determine which random access preamble was sent. The arrival timing can be determined from the location of the detected peak within a detection window.

Figure 5:
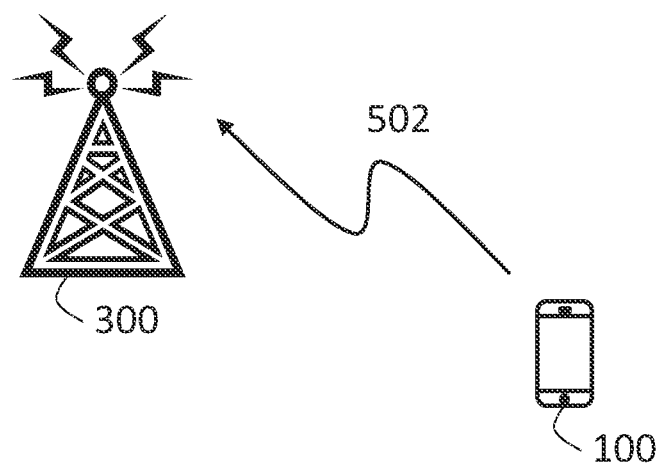
FIG. 5 shows a wireless communication system according to an embodiment of the present disclosure.

FIG. 5 shows a wireless communication system 500 according to an embodiment of the present disclosure. The wireless communication system 500 comprises a client device 100 and a network access node 300 configured to operate in the wireless communication system 500. For simplicity, the wireless communication system 500 shown in FIG. 5 only comprises one client device 100 and one network access node 300. However, the wireless communication system 500 may comprise any number of client devices 100 and any number of network access nodes 300 without deviating from the scope of the present disclosure. In the wireless communication system 500, the client device 100 is configured to transmit a wireless communication signal 502 to the network access node 300, the communication signal 502 comprising a random access preamble. Hence, the communication signal 502 can be any control signal according to a standard, such as LTE and NR.

Figure 6:
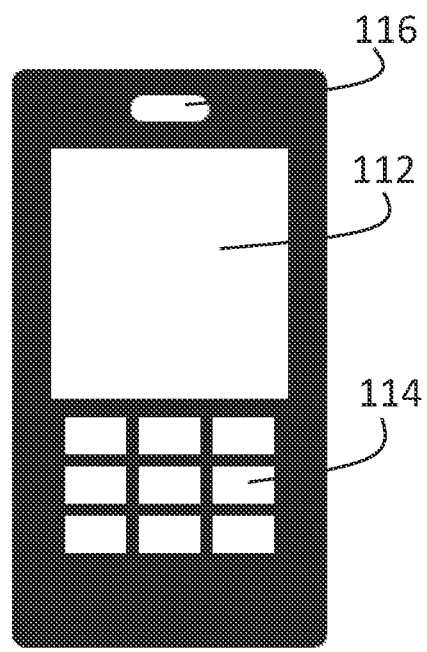
FIG. 6 illustrates a client device according to an embodiment of the present disclosure.

FIG. 6 illustrates a non-limiting example of a client device 100 in the form of a mobile device. The mobile device houses at least one processor 102 (see FIG. 1), at least one display device 112, and at least one communications means (not shown in FIG. 6). The mobile device further comprises input means e.g. in the form of a keyboard 114 communicatively connected to the display device 112. The mobile device further comprises output means e.g. in the form of a speaker 116. The mobile device may be a mobile phone, a tablet PC, a mobile PC, a smart phone, a standalone mobile device, or any other suitable communication device.

To provide deeper understanding of embodiments of the present disclosure consider a system with $\overline{M}$ available time-frequency resource blocks wherein M ($M \leq \overline{M}$) time-frequency resource blocks are used for transmitting the PRACH preamble, each comprising N subcarriers. The time-frequency resource blocks are enumerated with ordinal numbers $0 \leq m \leq \overline{M}-1$. It should be noted that $\overline{M}$ could be all resource blocks on the carrier, or all resource blocks on a part of the carrier bandwidth it can access for which a client device 100 has been configured to transmit and/or receive. Therefore, two major cases apply, in one case the set of resource blocks is equal to a total number of resource blocks configured for the client device 100. In another case the set of resource blocks is a subset of a total number of resource blocks configured for the client device 100.

Furthermore, the subcarriers in each time-frequency resource block are enumerated with the ordinal numbers $0 \leq n \leq N-1$. Also, a preamble sequence a(k) modulates K subcarriers in each time-frequency resource block where $0 < K \leq N$.

Figure 7:
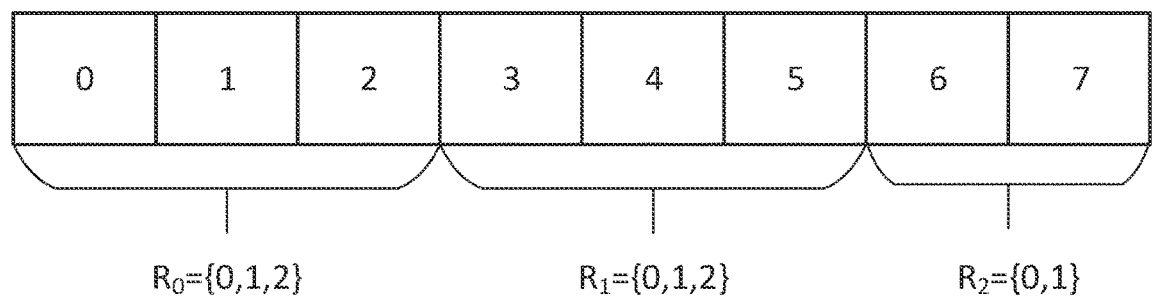
FIG. 7 shows an example of 8 time-frequency resource blocks which are divided into 3 subsets, each containing integers associated with the indices of the resource blocks of the subset.

An interlaced structure of resource blocks having a uniform spacing between them is characterized by a set of resource blocks m ∈ {0, p, 2p, . . . } where p is a positive integer. Such a set is referred to as an interlacement, or sometimes, an interlace. Equivalently, the set of resource blocks of an interlace can be expressed to be arranged according to an enumeration i=0, 1, . . . p−1 associated with $Q_i$ resource blocks $m_i \in \{i, i+p, i+2p, \ldots, i+(Q_i-1)p\}$ where p is an integer. It is realized that several interlaces with spacing p could be defined such that, for interlace i (i=0, 1, . . . p−1), $m_i \in \{i, i+p, i+2p, \ldots\}$. Thus, the number of supported interlaces would be no more than p and the spacing between the resource blocks in an interlace is p. If $\overline{M}/p$ is an integer, $\overline{M}/p$ represents the number of resource blocks of an interlace. For example, for a bandwidth of $\overline{M}$=100 resource blocks and interlaces with spacing p=10, there would be 10 interlaces, each comprising 10 resource blocks, equidistantly located every $10^{th}$ resource block. Otherwise, if $\overline{M}/p$ is not an integer, there could be $\overline{M} - \lfloor \overline{M}/p \rfloor \cdot \lfloor \overline{M}/p \rfloor$ interlaces with $\lfloor \overline{M}/p \rfloor + 1$ resource blocks and $\lfloor \overline{M}/p \rfloor - \overline{M} + \lfloor \overline{M}/p \rfloor \cdot \lfloor \overline{M}/p \rfloor$ with $\lfloor \overline{M}/p \rfloor$ resource blocks. For example, for a bandwidth of $\overline{M}$=106 resource blocks and interlaces with spacing p=10, there could be 6 interlaces with 11 resource blocks and 4 interlaces with 10 resource blocks, equidistantly located every $10^{th}$ resource block. The sidelobes in the auto-correlation function are large when an interlaced time-frequency resource block structure is applied since the resource blocks are located equidistantly. It is herein disclosed to select a set of M resource blocks irregularly. With reference to FIG. 7 an example of the disclosed solution can according to an embodiment be described as follows:

Divide the $\overline{M}$ ordinal indices into disjoint subsets $S_x = \{s_{x,0}, s_{x,1}, \ldots, s_{x,\overline{R}_x-1}\}$ of size $\overline{R}_x$. Define the corresponding subsets $R_x = \{s_{x,0} - s_{x,0}, s_{x,1} - s_{x,0}, \ldots, s_{x,\overline{R}_x-1} - s_{x,0}\}$ comprising integer values $0, 1, \ldots, \overline{R}_x - 1$. The subsets are ordered such that the first element of the subset corresponds to a first associated resource block, the second element of the subset corresponds to a second associated resource block etc.

Example: Consider $\overline{M}$=8 and 3 subsets, which is shown in FIG. 7:

The subset $S_0$={0,1,2} gives the subset $R_0$={0,1,2} which contains elements corresponding to resource blocks with ordinal numbers m=0, m=1, m=2, respectively.

The subset $S_1$={3,4,5} gives the subset $R_1$={0,1,2} which contains elements corresponding to resource blocks with ordinal numbers m=3, m=4, m=5, respectively.

The subset $S_2$={6,7} gives the subset $R_2$={0,1} which contains elements corresponding to resource blocks with ordinal numbers m=6, m=7, respectively.

The elements in each subset $R_x$ are re-ordered.

Example: $R_0=\{2,0,1\}$, $R_1=\{0,1,2\}$, $R_2=\{1,0\}$ $L_x$ elements are chosen from $R_x$ and the selected elements correspond to the used resource blocks in the respective subset $S_x$.

Example: Let $L_x=1$ and choose the first element from each re-ordered subset, resulting in elements 2, 0 and 1, which correspond to resource blocks 2, 3 and 7.

The formation of the subsets $S_x$ (and $R_x$) is made such that the number of subsets containing one resource block from every interlace is maximized. In other words, indices of the set of resource blocks are arranged according to an enumeration i=0, 1, ... p−1 associated with $Q_i$ resource blocks $m_i \in \{i, i+p, i+2p, \ldots, i+(Q_i-1)p\}$ where p is an integer, and wherein the set of resource blocks are divided into subsets of resource blocks so that the number of subsets is equal to a maximum $Q_i$ value and wherein the number of subsets comprising one resource block from each enumeration i is maximized. For example, in FIG. 8, $S_0=\{0,1,2,3,4\}$ and $S_1=\{5,6,7,8,9\}$ gives that there are two subsets and each subset contains one resource block from every interlace. There are five interlaces in total, each comprising two resource blocks. If all interlaces contain the same number of resource blocks, it follows that all subsets have the same size $\bar{R}_x$, e.g., $\bar{R}_0=\bar{R}_1=5$ in this example. If some interlaces have one resource block more than the others, the number of subsets containing one resource block from every interlace is maximized if there is only one subset which has a size $\bar{R}_x$ smaller than the others. For example, suppose a case where $\bar{M}=12$ and there are 5 interlaces containing resource blocks: $\{0,5,10\}$, $\{1,6,11\}$, $\{2,7\}$, $\{3,8\}$ and $\{4,9\}$. Then, the subsets would be $S_0=\{0,1,2,3,4\}$, $S_1=\{5,6,7,8,9\}$ and $S_2=\{10,11\}$. Here, the number of subsets containing one resource block from every interlace is equal to two.

Figure 8:
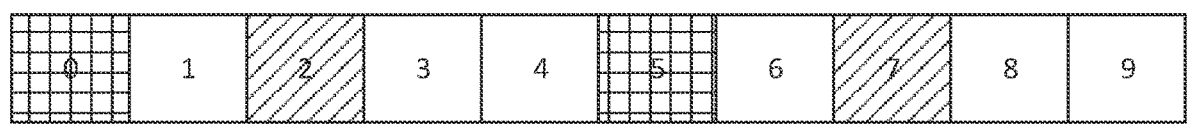
FIG. 8 shows an example of resource block allocation using two interlaces, each including uniformly spaced resource blocks.

Furthermore, it is realized that in FIG. 8 the resource block allocation is the same from each subset, i.e., element 0 and 2 are selected from $R_0=\{0,1,2,3,4\}$, and element 0 and 2 are selected from $R_1=\{0,1,2,3,4\}$. Hence, according to an embodiment of the present disclosure the same number of resource blocks is selected from each subset of resource blocks.

In one embodiment, $L_x$ elements, where $1 \leq L_x \leq \bar{R}_x$, are selected from subset $R_x$ and each selected element is associated with one resource block. Thus, in total there could be $$\prod_x \binom{\bar{R}_x}{L_x}$$

different assignments of resource blocks over all subsets, which is computed as the product of the binomial coefficients denoting the number of combinations per subset. The number of selected elements $L_x$ can be the same for all subsets. This is beneficial as the same type of selection processing could be applied to each subset. Moreover, it increases the likelihood that the same number of resource blocks is selected from each interlace. Furthermore, according to an embodiment the selection is made such that there is at least one subset $R_x$ for which at least one of the selected elements is different from the selected elements of all the other subsets $R_y$ with x≠y. This creates an irregular pattern according to the present disclosure. The selection could be achieved by re-ordering the elements of the subsets $R_x$ and selecting $L_x$ elements from pre-determined positions in the reordered set, e.g., the first $L_x$ elements, the last $L_x$ elements, etc. Resource blocks for different random access preambles could be determined by either selecting different elements of the subset (in which case the different preambles utilize orthogonal sets of resource blocks) or by selecting $L_x$ elements which are all the same, or for which some of the elements are the same (in which case different preambles have all or some resource blocks in common).

In one embodiment, the subsets $R_x$ are further pruned (i.e., some elements are removed) as to include only elements that are associated with a pre-defined set of interlaces (i.e., a subset of the total number of available resource blocks). After pruning, as in previous embodiment, the subsets are re-ordered and $L_x$ elements, where $1 \leq L_x \leq \bar{R}_x$, are selected from the pruned and re-ordered subset $R_x$ and each selected element is associated with one resource block. In other words, indices of the set of resource blocks are arranged according to an enumeration i=0, 1, ... p−1 associated with $Q_i$ resource blocks $m_i \in \{i, i+p, i+2p, \ldots, i+(Q_i-1)p\}$ where p is an integer. Further, the subset of the total number of resource blocks configured for the client device 100 comprises resource blocks obtained from at most p−1 enumerations. An advantage of this is that only resource blocks from certain interlaces are selected, which makes it easier to multiplex the PRACH preamble with other channels, which could utilize the remaining interlaces. Moreover, the pruning could take into account that the valid interlaces are selected to provide maximum transmit power (i.e., consecutive interlaces are not favored) or to provide sufficient occupied channel bandwidth.

As a practical example, the NR system provides three different subcarrier spacings, 15, 30 and 60 kHz, resulting in different interlace structures. For 15 kHz subcarrier spacing, one example is to define 10 interlaces where the resource blocks are spaced by 10 resource blocks in each interlace. The subsets could for example be chosen such that resource blocks from interlace 0, 3, 5 and 8 are in the pruned subsets. For 30 kHz subcarrier spacing, one example is to define 5 interlaces where the resource blocks are spaced by 5 resource blocks in each interlace. The subsets could for example be chosen such that resource blocks from interlace 0 and 2, or 0 and 3, are in the pruned subsets. For 60 kHz subcarrier spacing, one example is to define 3 interlaces where the resource blocks are spaced by 3 resource blocks in each interlace. The subsets could for example be chosen such that resource blocks from interlace 0 and 1, or 0 and 2, are in the pruned subsets.

Figure 9:
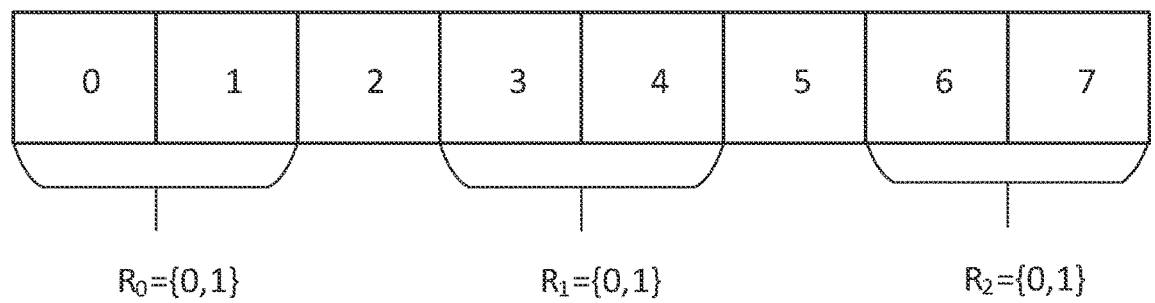
FIG. 9 shows an example of 8 time-frequency resource blocks which are divided into 3 subsets, each containing integers associated with the indices of the resource blocks of the subset.

FIG. 9 shows an example of the arrangement of the subsets for $\bar{M}=8$ where there are 3 interlaces, $m_0 \in \{0,3,6\}$, $m_1 \in \{1,4,7\}$ and $m_2 \in \{2,5\}$. The pruned subsets $R_x$ are only including elements corresponding to interlace 0 and 1. Resource blocks for different preambles could be determined by either selecting different elements (in which case the different preambles utilize orthogonal sets of resource blocks) or by selecting $L_x$ elements which are all the same, or for which some are the same (in which case different preambles have all or some resource blocks in common).

Figure 10:
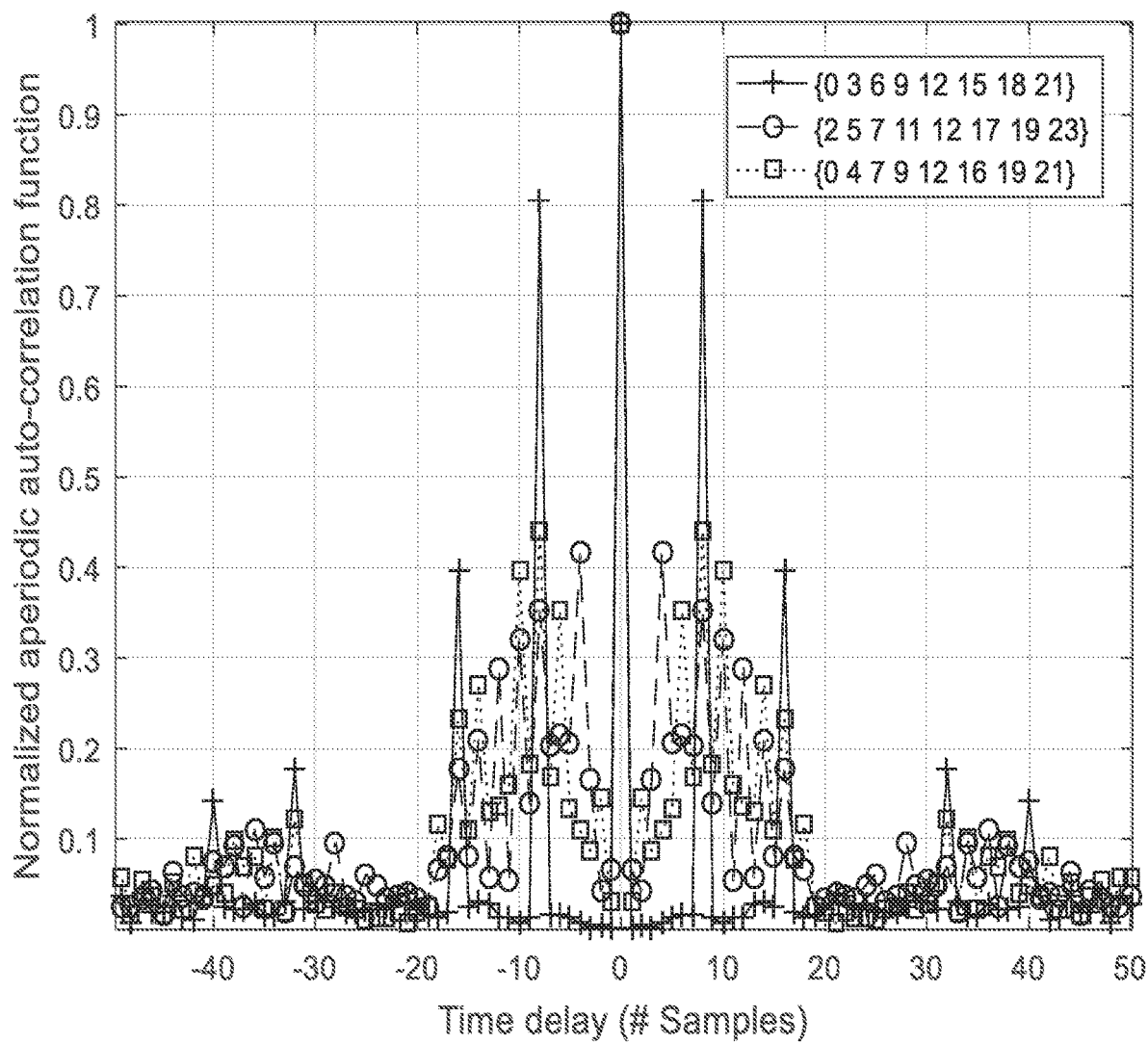
FIG. 10 shows aperiodic auto-correlation function of preambles with different PRB mappings and random phased modulation sequence.

In one example with $\bar{M}=24$ resource blocks grouped into 3 interlaces, i.e., $m_0 \in \{0,3,6,9,12, 15, 18, 21\}$, $m_1 \in \{1,4,7,10,13,16,19,22\}$ and $m_2 \in \{2,5,8,11,14,17,20,23\}$, one can divide the $\bar{M}=24$ resource blocks into 8 subsets $R_x$ comprising integer values 0, 1, ..., $\bar{R}_x-1$ with $\bar{R}_x=3$ for all x. By letting $L_x=1$, the selection of resource blocks from each subset $R_x$ can either be the same, or be random in subsets $R_x=\{0,1,2\}$, or be random in pruned subsets of $R_x$, e.g., $\{0,1\}$. FIG. 10 shows the aperiodic auto-correlation functions of these three different resource block selection schemes. The selected resource block indexes in different schemes are marked in FIG. 10. From the figure, we can see that the random and non-uniform resource block selection from either the subsets $R_x$ or pruned subsets of $R_x$ can significantly suppress the relative values of side-lobes, e.g., from more than 80% to less than 50% of the main-lobe, compared to the case where the same selection is made in each subset.

The location of the resource blocks for the PRACH preamble are known to the client device 100, e.g., they could be pre-defined by a standard or could be unambiguously determined. The skilled reader may utilize other mathematical representations to achieve the same resource block allocation pattern. For example, a binary sequence, e.g., a bitmap of length $\overline{M}$, where a '1' could represent an allocated resource block.

It is to be understood that some resulting resource block allocation patterns may not be utilized, e.g., they do not fulfill the OCB requirement or cannot produce large enough transmit power under a PSD constraint. Such patterns may be disregarded. Also, it is understood that the selection of resource blocks from each subset should be made such that the resulting allocation from all subsets becomes irregular.

According to embodiments of the present disclosure, at least one resource block in a subset of resource blocks is selected based on at least one random variable, an interleaver, or a binary sequence. More specifically, indices corresponding to resource blocks of a subset of resource blocks are permuted based on the random variable, the interleaver, or the binary sequence, and wherein resource blocks in the subset of resource blocks are selected based on the permuted indices.

In an embodiment of the present disclosure, the re-ordering of the subset $R_x$ is made by using a permutation of the elements using random variables. One example is to generate $\overline{R}_x$ random variables $Y_i$, i=0,1,..., $\overline{R}_x-1$ and letting the first element of the re-ordered subset $R_x$ be the index i corresponding to the smallest (or largest) value of $Y_i$, letting the second element of the re-ordered subset $R_x$ be the index i corresponding to the second smallest (or second largest) value of and so on. Another example is to generate integers $I_i = \lfloor \overline{R}_x \cdot Y_i \rfloor + 1$, i=0,1,..., $\overline{R}_x-1$, where $Y_i$ are a random variables defined on the interval [0,1]. This gives $\overline{R}_x$ random integers in the range [1, $\overline{R}_x$] which are used to interchange the order of the elements in the subset $R_x$. For example, starting from the first (or last) element and proceeding through the elements, the element in the i:th position of $R_x$ is interchanged with the element in the $I_i$:th position of $R_x$.

In an embodiment of the present disclosure, the re-ordering of the subset $R_x$ is made by a permutation of the $\overline{R}_x$ integers by using an interleaver. For example, let the vector $\overline{r}=[0,1,\ldots,\overline{R}_x-1]$ be the input to a permutation operator $\pi_x(\cdot)$ (e.g. an interleaver) such that $\tilde{r}_x = \pi_x(\overline{r})$ denotes the vector of $\overline{R}_x$ permuted indices in subset $R_x$. An example of an interleaver is;

$C = \overline{R}_x / R$ $c = 0, 1, \ldots, C-1$ $r = 0, 1, \ldots, R-1$ $k = c \cdot R + r$ $\pi_x(k) = (r \cdot C + c + x) \bmod \overline{R}_x$ where $R \in \{2,3,6\}$ is an interleaver parameter.

In an embodiment of the present disclosure, the re-ordering of the subset $R_x$ is made by a permutation by using a binary sequence. In a first non-limiting example, the binary sequence length is the same as the number of available resource blocks, e.g., $\overline{M}$, and each element, 0 or 1, denotes whether a resource block is allocated or not. There exist several types of sequences which exhibit a pseudo-random property, such as Gold sequences, which could be suitable for obtaining an irregular resource block mapping. They are typically implemented by shift registers and it is sufficient that the transmitter of the client device 100 and the receiver of the network access node 300 knows the initial state for generating the same binary sequence. Thus, the initial state could either be signaled from the network access node 300 to the client device 100 or it could be unambiguously determined by relating it to other parameters known to the client device 100.

In a second non-limiting example, binary sub-sequences of lengths corresponding to the size of the subsets are concatenated into one sequence of length being the same as the number of available resource blocks. Since it is desirable to select the same number of resource blocks from every subset, the sub-sequences should have the same Hamming weight, i.e., include the same number of ones "1". The binary sub-sequences could therefore be obtained as the codewords from a constant-weight-code known in the art. Sets of binary sub-sequences could be pre-determined, e.g., in a table known to both the transmitter of the client device 100 and the receiver of the network access node 300, such that random access preambles could be generated unambiguously.

In a third non-limiting example, resource blocks are selected from two interlaces using a binary sequence (e.g., a zero denotes taking a resource block from the first interlace and a one denotes taking a resource block from the second interlace) where the binary sequence length is the same as the number of subsets. Thus, a value of the sequence denotes the selection of a resource block within a subset. The Prouhet-Thue-Morse (PTM) sequence may be utilized for this as it has several suitable properties. For example, if the sequence length is even, the number of zeros "0" is the same as the number of ones "1", which implies that the same number of resource blocks is selected from each interlace.

Figure 11:
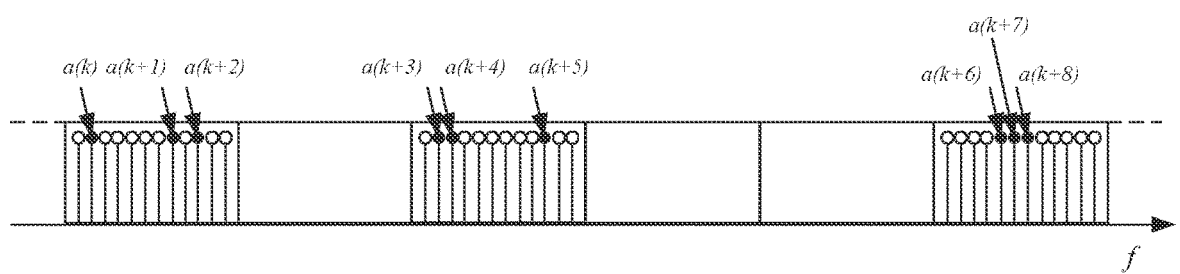
FIG. 11 shows an example where the modulation sequence is mapped to 3 subcarriers in each time-frequency resource block. The modulation sequence length is the same as the number of modulated subcarriers.

In one embodiment of the present disclosure, the length of the modulation sequence corresponds to the number of modulated subcarriers, i.e., $k=0,1,\ldots,M\cdot K-1$, i.e., is equal to the total number of modulated subcarriers. FIG. 11 shows an example where N=12 and K=3. Thus, each element of the sequence is mapped to a subcarrier.

Figure 12:
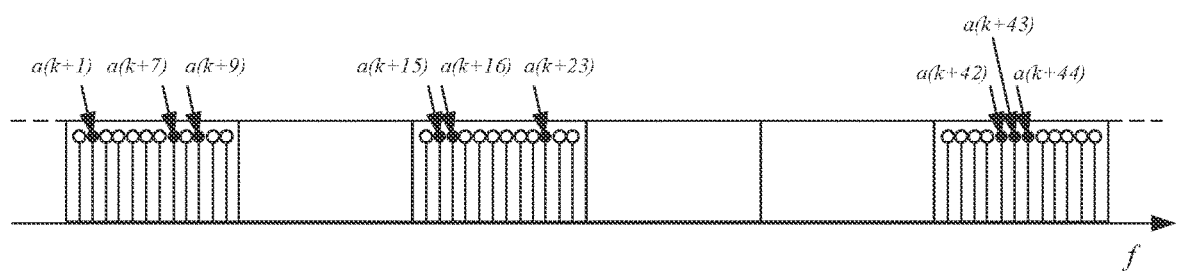
FIG. 12 shows an example where the modulation sequence is mapped to 3 subcarriers in each time-frequency resource block. The modulation sequence length is the same as the total number of available subcarriers.

In one embodiment of the present disclosure, the length of the modulation sequence corresponds to the total number of subcarriers, i.e., $k=0,1,\ldots,\overline{M}\cdot N-1$, where M is the maximum number of time-frequency resource blocks available for PRACH preamble transmission, i.e. is larger than the total number of modulated subcarriers. FIG. 12 shows an example where N=12 and K=3. Thus, the sequence of length $\overline{M}\cdot N$ is punctured into a sequence of length M·K.

Figure 13:
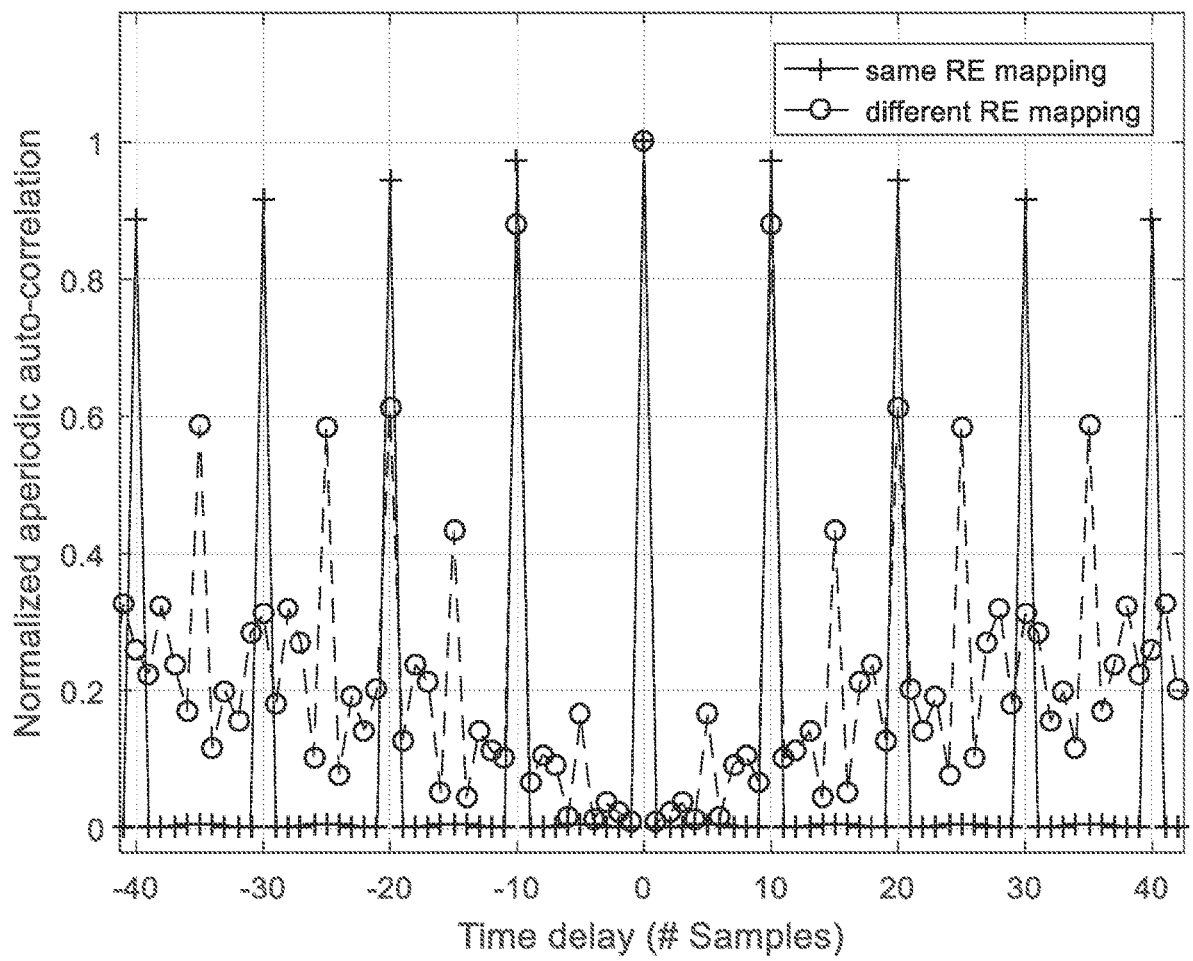
FIG. 13 shows aperiodic auto-correlation function of preambles with uniformly spaced PRBs and same/different sequence mapping in each PRB.

FIG. 13 shows the auto-correlation function for K=1 and M=10, where the resource blocks are uniformly spaced 3 resource blocks apart in a bandwidth containing 30 resource blocks in total. The solid line marked with '+' shows the case where the same sequence mapping is made in each resource block, while the dotted line marked with 'o' shows the case where a different sequence mapping is made in each resource block, created by a pseudo-random pattern. It can be seen that the dominant sidelobe decreased from 97% to 88% of the main-lobe by using different sequence mapping.

Figure 14:
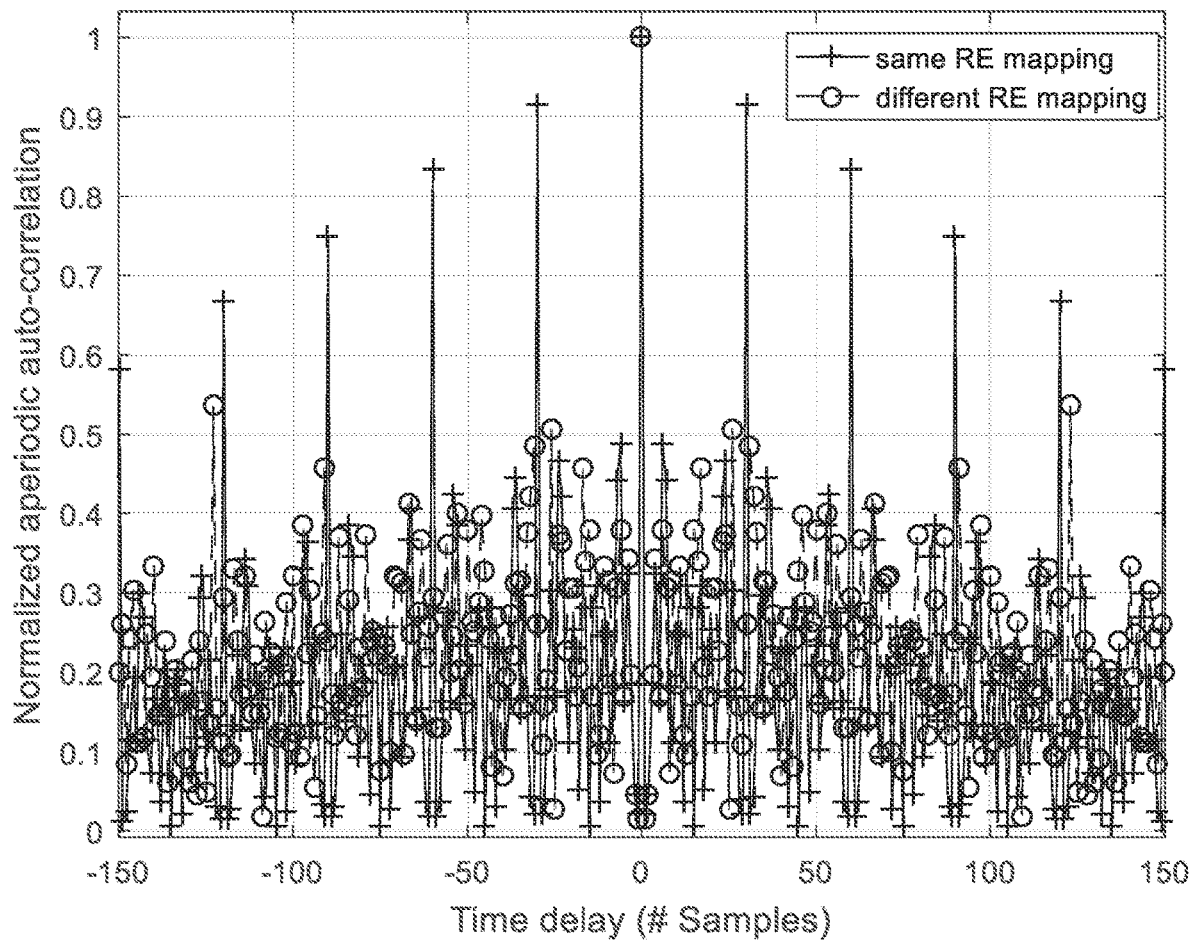
FIG. 14 shows aperiodic auto-correlation function of preambles with non-uniformly spaced PRBs and same/different sequence mapping in each PRB.

FIG. 14 also shows the same evaluation but for a case where the 10 resource blocks are non-uniformly spaced (i.e., resource blocks 0, 4, 8, 9, 14, 17, 18, 23, 25, 29 are allocated). Also, here it is shown that the dominant sidelobe decreased from 91% to 54% of the main-lobe by using different sequence mapping. In addition, it is seen that the position of the dominant side-lobe becomes further away from the main-lobe by using different sequence mapping, indicating that a larger detection window (and in turn a larger cell radius) can be applied.

Thus, it is realized that the sequence mapping should exhibit a certain form of randomness. The present disclosure discloses that, in at least one time-frequency resource block, the mapping of modulation sequence to subcarriers is different from that of at least one other time-frequency resource block. In other words, a selection of modulated subcarriers in a selected resource block is different from a selection of modulated subcarriers in another selected resource block. Thus, this can be applied if one random access preamble does not utilize all subcarriers in a resource block. Moreover, the selection of subcarriers could be made independent of the selected resource blocks. Therefore, subcarrier selection can also be applied for allocations of uniformly spaced resource blocks, which will provide benefits for the auto-correlation function, since an irregular frequency resource mapping is achieved on subcarrier level. It is understood that a non-uniform mapping of the modulation sequence has benefits regardless if the mapping of the resource blocks is uniform or not.

Pseudo-randomness for the sequence mapping could be achieved by permuting the subcarrier indices in each time-frequency resource block. Randomly ordered integers, i.e., subcarrier indices, could be generated using pseudo-random number generators, e.g., as described by the principles previously. A resource block with 12 subcarriers could consequently utilize up to 12 random variables. However, a simpler way is to utilize a function not requiring a random seed, to permute a set of integers, i.e., an interleaver. Therefore, in line with the permutation of resource blocks according to embodiments of the present disclosure, at least one subcarrier in each selected resource block is selected based on at least one random variable, an interleaver, or a binary sequence. More specifically, indices corresponding to subcarriers of a selected resource block are permuted based on the random variable, the interleaver or the binary sequence, and wherein subcarriers in the selected resource block are selected based on the permuted indices.

In an embodiment of the present disclosure, the set of ordinal numbers referring to the subcarriers in a time-frequency resource block carrying the modulation sequence, is obtained by a permutation of the N integers. For example, let the vector $\bar{k}=[0,1,\ldots,N-1]$ be the input to a permutation operator $\pi_m(\cdot)$ (e.g. an interleaver) such that $\bar{k}_m=\pi_m(\bar{k})$ denotes the vector of N permuted indices in time-frequency resource block m. A randomized mapping is achieved by selecting K entries from $\bar{k}_m$ to which subcarriers the modulation sequence is mapped in time-frequency resource block m. The selection of entries could be pre-determined, e.g., one preamble is assigned entries $0, 1, \ldots, K-1$, a second preamble is assigned entries $K, K+1, \ldots, 2K-1$, etc. Non-orthogonal preambles could be generated by selecting at least one subcarrier to be common among the preambles.

In a further embodiment of the present disclosure, the positions of groups of K subcarriers are determined. For example, let the vector $k=[0, 1, \ldots, N/K-1]$ be the input to a permutation operator $\pi_m(\cdot)$ (e.g., an interleaver) such that $\bar{k}_m=\pi_m(\bar{k})$ denotes the vector of N/K permuted indices in time-frequency resource block m. A randomized mapping is achieved by selecting one entry $k_{m,0}$ from $\bar{k}_m$ and letting $K \cdot k_{m,0}, K \cdot k_{m,0}+1, \ldots, K \cdot k_{m,0}+K-1$ be the subcarriers the modulation sequence is mapped to time-frequency resource block m. An example of interleaver is:

$$C=N/R$$

$$c=0,1,\ldots,C-1$$

$$r=0,1,\ldots,R-1$$

$$k=c \cdot R+r$$

$$\pi_m(k)=(r \cdot C+c+m) \bmod N$$

where $R \in \{2,3,6\}$ is an interleaver parameter.

In an embodiment of the present disclosure, it is realized that less than M interleavers could be used. For example, the set of integers denoting the subcarriers to be modulated in time-frequency resource block m' could be a cyclically shifted modulo N from the integers denoting the subcarriers to be modulated in time-frequency resource block m, which could be determined by $\pi_m$.

The client device 100 herein, may be denoted as a user device, a User Equipment (UE), a mobile station, an internet of things (IoT) device, a sensor device, a wireless terminal and/or a mobile terminal, is enabled to communicate wirelessly in a wireless communication system, sometimes also referred to as a cellular radio system. The UEs may further be referred to as mobile telephones, cellular telephones, computer tablets or laptops with wireless capability. The UEs in this context may be, for example, portable, pocket-storable, hand-held, computer-comprised, or vehicle-mounted mobile devices, enabled to communicate voice and/or data, via the radio access network, with another entity, such as another receiver or a server. The UE can be a Station (STA), which is any device that contains an IEEE 802.11-conformant Media Access Control (MAC) and Physical Layer (PHY) interface to the Wireless Medium (WM). The UE may also be configured for communication in 3GPP related LTE and LTE-Advanced, in WiMAX and its evolution, and in fifth generation wireless technologies, such as New Radio.

The network access node 300 herein may also be denoted as a radio network access node, an access network access node, an access point, or a base station, e.g. a Radio Base Station (RBS), which in some networks may be referred to as transmitter, "gNB", "gNodeB", "eNB", "eNodeB", "NodeB" or "B node", depending on the technology and terminology used. The radio network access nodes may be of different classes such as e.g. macro eNodeB, home eNodeB or pico base station, based on transmission power and thereby also cell size. The radio network access node can be a Station (STA), which is any device that contains an IEEE 802.11-conformant Media Access Control (MAC) and Physical Layer (PHY) interface to the Wireless Medium (WM). The radio network access node may also be a base station corresponding to the fifth generation (5G) wireless systems.

Furthermore, any method according to embodiments of the present disclosure may be implemented in a computer program, having code means, which when run by processing means causes the processing means to execute the steps of the method. The computer program is included in a computer readable medium of a computer program product. The computer readable medium may comprise essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that embodiments of the client device 100 and the network access node 300 comprises the necessary communication capabilities in the form of e.g., functions, means, units, elements, etc., for performing the solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the solution.

Especially, the processor(s) of the client device 100 and the network access node 300 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the present disclosure is not limited to the embodiments described above, but also relates to and incorporates all embodiments within the scope of the appended independent claims.

What is claimed is:

1. A client device for a wireless communication system, the client device being configured to transmit a random access preamble to a network access node, the random access preamble comprising:
   a division of a set of resource blocks available for transmission of the random access preamble into at least two subsets of resource blocks, wherein each resource block in the set of resource blocks comprises a plurality of subcarriers;
   a first selection of resource blocks within a first subset of resource blocks and a second selection of resource blocks within a second subset of resource blocks, wherein the first selection of resource blocks is different than the second selection of resource blocks; and
   a mapping of a modulation sequence of the random access preamble onto at least one subcarrier in each selected resource block.

2. The client device according to claim 1, wherein a same number of resource blocks is selected from each of the first subset and the second subset of resource blocks.

3. The client device according to claim 1, wherein at least one resource block from the first subset or the second subset of resource blocks is selected based on at least one random variable, an interleaver, or a binary sequence.

4. The client device according to claim 3, wherein indices corresponding to the resource blocks within the first subset and the second subset of resource blocks are permuted based on the at least one random variable, the interleaver, or the binary sequence, and wherein the at least one resource block from the first subset or the second subset of resource blocks is selected based on the permuted indices.

5. The client device according to claim 1, wherein at least one subcarrier in each selected resource block is selected based on at least one random variable, an interleaver, or a binary sequence.

6. The client device according to claim 5, wherein indices corresponding to subcarriers of a selected resource block are permuted based on the at least one random variable, the interleaver or the binary sequence, and wherein subcarriers in the selected resource block are selected based on the permuted indices.

7. The client device according to claim 5, wherein a same number of subcarriers is selected in each selected resource block.

8. The client device according to claim 5, wherein a selection of modulated subcarriers in a selected resource block is different from a selection of modulated subcarriers in another selected resource block.

9. The client device according to claim 1, wherein a length of the modulation sequence is equal to or larger than a total number of modulated subcarriers.

10. The client device according to claim 1, wherein the set of resource blocks is equal to a total number of resource blocks configured for the client device.

11. The client device according to claim 1, wherein the set of resource blocks is a subset of a total number of resource blocks configured for the client device.

12. The client device according to claim 11, wherein indices of the set of resource blocks are arranged according to an enumeration $i=0, 1, \ldots p-1$ associated with $Q_i$ resource blocks $m_i \in \{i, i+p, i+2p, \ldots, i+(Q_i-1)p\}$ where p is an integer, and wherein the subset of the total number of resource blocks configured for the client device comprises resource blocks obtained from at most $p-1$ enumerations.

13. The client device according to claim 1, wherein indices of the set of resource blocks are arranged according to an enumeration $i=0, 1, \ldots p-1$ associated with $Q_i$ resource blocks $m_i \in \{i, i+p, i+2p, \ldots, i+(Q_i-1)p\}$ where p is an integer, and wherein the set of resource blocks are divided into subsets of resource blocks so that the number of subsets is equal to a maximum $Q_i$ value and wherein the number of subsets comprising one resource block from each enumeration i is maximized.

14. A network access node for a wireless communication system, the network access node being configured to:
   receive a signal comprising a random access preamble from a client device, wherein the random access preamble comprises:
   a division of a set of resource blocks available for transmission of the random access preamble into at least two subsets of resource blocks, wherein each resource block in the set of resource blocks comprises a plurality of subcarriers,
   a first selection of resource blocks within a first subset of resource blocks and a second selection of resource blocks within a second subset of resource blocks, wherein the first selection of resource blocks is different than the second selection of resource blocks, and
   a mapping of a modulation sequence of the random access preamble onto at least one subcarrier in each selected resource block; and
   detect at least one of the random access preamble and an arrival timing of the random access preamble based on the received signal.

15. A method for a client device, the method comprising transmitting a random access preamble to a network access node, the random access preamble comprising:
   a division of a set of resource blocks available for transmission of the random access preamble into at least two subsets of resource blocks, wherein each resource block in the set of resource blocks comprises a plurality of subcarriers;

a first selection of resource blocks within a first subset of resource blocks and a second selection of resource blocks within a second subset of resource blocks, wherein the first selection of resource blocks is different than the second selection of resource blocks; and a mapping of a modulation sequence of the random access preamble onto at least one subcarrier in each selected resource block.

16. A method for a network access node, the method comprising receiving a signal comprising a random access preamble from a client device, wherein the random access preamble comprises:

a division of a set of resource blocks available for transmission of the random access preamble into at least two subsets of resource blocks, wherein each resource block in the set of resource blocks comprises a plurality of subcarriers, a first selection of resource blocks within a first subset of resource blocks and a second selection of resource blocks within a second subset of resource blocks, wherein the first selection of resource blocks is different than the second selection of resource blocks, and a mapping of a modulation sequence of the random access preamble onto at least one subcarrier in each selected resource block; and detecting at least one of the random access preamble and an arrival timing of the random access preamble based on the received signal.

17. A non-transitory computer-readable medium storing a computer program with a program code that, when run on a computer, cause the computer to perform the method according to claim 15.

18. A non-transitory computer-readable medium storing a computer program with a program code that, when run on a computer, cause the computer to perform the method according to claim 16.

* * * * *